(12) United States Patent
Deppe et al.

(10) Patent No.: US 8,933,728 B2
(45) Date of Patent: Jan. 13, 2015

(54) DRIVER CIRCUIT FOR DRIVING A LOAD CIRCUIT

(75) Inventors: Carsten Deppe, Aachen (DE); Christian Hattrup, Wurselen (DE)

(73) Assignee: Koninklijke Philips N.V., Eindhoven (NL)

( * ) Notice: Subject to any disclaimer, the term of this patent is extended or adjusted under 35 U.S.C. 154(b) by 47 days.

(21) Appl. No.: 13/512,436

(22) PCT Filed: Dec. 1, 2010

(86) PCT No.: PCT/IB2010/055517
§ 371 (c)(1),
(2), (4) Date: Nov. 5, 2012

(87) PCT Pub. No.: WO2011/070481
PCT Pub. Date: Jun. 16, 2011

(65) Prior Publication Data
US 2013/0043910 A1    Feb. 21, 2013

(30) Foreign Application Priority Data

Dec. 11, 2009 (EP) ..................................... 09178800

(51) Int. Cl.
*H02M 5/00* (2006.01)
*H05B 41/14* (2006.01)
*H05B 41/28* (2006.01)

(52) U.S. Cl.
CPC ................ *H05B 41/28* (2013.01); *H01J 7/345* (2013.01)
USPC ............................ 327/108; 327/538; 323/271

(58) Field of Classification Search
None
See application file for complete search history.

(56) References Cited

U.S. PATENT DOCUMENTS

| 4,816,721 | A | * | 3/1989 | Ganser et al. | ............. 315/241 R |
| 6,121,694 | A | * | 9/2000 | Thereze | ......................... 307/64 |
| 7,274,577 | B2 | * | 9/2007 | Utsunomiya | ................... 363/59 |

FOREIGN PATENT DOCUMENTS

| FR | 2742010 | 6/1997 |
| FR | 2765045 | 12/1998 |
| JP | 59117095 A | 7/1984 |
| JP | 06209574 A | 7/1994 |
| WO | 9619036 | 6/1996 |
| WO | 9925159 | 5/1999 |

* cited by examiner

*Primary Examiner* — Lincoln Donovan
*Assistant Examiner* — Terry L Englund
(74) *Attorney, Agent, or Firm* — Yuliya Mathis

(57) ABSTRACT

Driver circuits (1) for driving load circuits (2, 3) receive source signals from sources and provide feeding signals to the load circuits (2,3) and charging signals to capacitor circuits (21). These capacitor circuits (21) provide supporting signals to the load circuits (2, 3) in addition to the feeding signals. By providing the driver circuits (1) with control circuits (22) for controlling the supporting signals, the capacitor circuits (21) can become less bulky/costly and/or will limit the lifetime of the driver circuits (1) to a smaller extent. Further, these driver circuits (1) may get improved efficiencies. Said controlling may comprise controlling moments in time at which the supporting signals are offered to the load circuits (2, 3) or not, and/or may comprise controlling sizes of the supporting signals, and/or may be done in response to detection results from detectors (23) for detecting parameters of one or more signals. Said controlling may comprise switching via switches (24).

17 Claims, 4 Drawing Sheets

DRIVER CIRCUIT FOR DRIVING A LOAD CIRCUIT

FIELD OF THE INVENTION

The invention relates to a driver circuit for driving a load circuit. The invention further relates to a device comprising a driver circuit, to a method for driving a load circuit via a driver circuit, to a computer program product, and to a medium.

Examples of such a driver circuit are drivers. Examples of such a load circuit are loads like electronic lamps and converters coupled to one or more electronic lamps.

BACKGROUND OF THE INVENTION

Usually, inputs of a driver for driving a load are connected to a source, and outputs of the driver are connected to the load. A capacitor is used for compensating low amplitudes of a (rectified) source voltage and/or for smoothing amplitude variations of the (rectified) source voltage.

Such a capacitor is relatively disadvantageous in that it is bulky and costly and limits a lifetime of a driver.

SUMMARY OF THE INVENTION

Objects of the invention are to provide a driver circuit for driving a load circuit, a device comprising a driver circuit, a method for driving a load circuit via a driver circuit, a computer program product, and a medium, that are relatively advantageous.

According to a first aspect of the invention, a driver circuit is provided for driving a load circuit, the driver circuit comprising an input terminal for receiving a source signal from a source and for providing a feeding signal and a charging signal, a capacitor circuit for receiving the charging signal and for providing a supporting signal, an output terminal for receiving the feeding signal and the supporting signal and for providing the feeding signal and the supporting signal to the load circuit, and a control circuit for controlling the supporting signal.

The input terminal of the driver circuit receives the source signal from the source and provides the feeding signal destined for the load circuit and the charging signal destined for the capacitor circuit. The capacitor circuit receives the charging signal for charging one or more capacitors in the capacitor circuit and provides the supporting signal destined for the load circuit for compensating and/or smoothing the feeding signal. The output terminal receives this feeding signal and this supporting signal and provides them to the load circuit. By having provided the driver circuit with the control circuit for controlling the supporting signal, such as controlling moments in time at which the supporting signal is offered to the load circuit or not, and/or such as controlling a size of the supporting signal, one or more capacitors in the capacitor circuit can become less bulky and/or less costly and/or will limit the lifetime of the driver circuit to a smaller extent. Further, the driver circuit can have an improved efficiency. Such a driver circuit is relatively advantageous.

According to an embodiment, the driver circuit is defined by the control circuit comprising a detector for detecting a parameter of at least one of the signals, the control circuit being arranged for controlling the supporting signal in response to a detection result. By having provided the control circuit with the detector, the supporting signal can be controlled in dependence of one or more detection results.

According to an embodiment, the driver circuit is defined by said controlling comprising switching, the control circuit comprising a switch for performing said switching. This is a relatively simple embodiment owing to the fact that the switch can be easily implemented.

According to an embodiment, the driver circuit is defined by the driver circuit further comprising a bleeder circuit for providing a bleeder current in response to said detection result or in response to a further detection result from the detector.

This is a relatively efficient embodiment owing to the fact that the detector is used for controlling the supporting current as well as the bleeder current. The bleeder circuit allows basic dimmers to be used, that require continuous and/or minimum (non-zero) currents to flow.

According to an embodiment, the driver circuit is defined by the parameter of at least one of the signals being a parameter of the source signal and/or a parameter of the feeding signal. The source signal and/or the feeding signal are most suitable for providing one or more parameters for an advantageous control of the supporting signal.

According to an embodiment, the driver circuit is defined by the source signal being a voltage signal, the feeding signal and the charging signal and the supporting signal being current signals, the parameter of the source signal being a voltage amplitude and the parameter of the feeding signal being a current amplitude.

According to an embodiment, the driver circuit is defined by the driver circuit further comprising a further input terminal, the input terminal being designed for being coupled to one side of the source and the further input terminal being designed for being coupled to a further side of the source, and a further output terminal, the output terminal being designed for being coupled to one side of the load circuit and the further output terminal being designed for being coupled to a further side of the load circuit.

Either the further input terminal or the further output terminal may further be coupled to ground, or not.

According to an embodiment, the driver circuit is defined by the driver circuit further comprising a current limitation circuit for coupling the capacitor circuit to one of the terminals.

Such a current limitation circuit limits the charging current flowing from the source to the capacitor circuit to prevent the capacitor circuit from drawing the charging current with a too large current amplitude. Compared to an older situation, wherein the current limitation circuit was located between source and driver circuit, the present situation is more advantageous owing to the fact that the current limitation circuit at its present location no longer limits the feeding current (reduced power consumption).

According to an embodiment, the driver circuit is defined by the input terminal being coupled to the output terminal via a first diode and being coupled to the further output terminal via a second diode, the further input terminal being coupled to the output terminal via a third diode and being coupled to the further output terminal via a fourth diode, and the current limitation circuit comprising a serial connection of a resistor and a fifth diode. This is a relatively simple embodiment whereby the driver circuit is based on a rectifier bridge.

According to an embodiment, the driver circuit is defined by the control circuit comprising a detector for detecting an amplitude of the source signal, the detector comprising a serial connection of two resistors, one side of the detector being coupled to the input terminal via a sixth diode and to the further input terminal via a seventh diode, and a further side of the detector being coupled to the further output terminal, the detector further comprising a transistor, a control electrode of the transistor being coupled via a further resistor to an interconnection in the serial connection of the two resistors, a first main electrode of the transistor being coupled to the further output terminal, and a second main electrode of the transistor forming an output of the detector and being coupled via serially interconnected yet further resistors to the one side of the detector. This is a relatively simple embodiment whereby the detector is based on a voltage divider.

According to an embodiment, the driver circuit is defined by said one of the terminals being the further output terminal, said controlling comprising switching, the control circuit comprising a switch for performing said switching, said switch comprising first, second and third transistors, a control electrode of the first transistor being coupled to the output of the detector, a first main electrode of the first transistor being coupled to the further output terminal via a first resistance and to a first main electrode of the second transistor, a second main electrode of the first transistor being coupled to an interconnection between the serially interconnected yet further resistors, a control electrode of the second transistor being coupled to the further output terminal via a second resistance, a second main electrode of the second transistor being coupled to one side of a further detector, the further detector comprising a further serial connection of two resistors, a further side of the further detector being coupled to a connection between the resistor and the fifth diode of the current limitation circuit and to a first main electrode of the third transistor, a control electrode of the third transistor being coupled to an output of the further detector, and a second main electrode of the third transistor being coupled to the further output terminal. The third transistor may comprise two transistors in a Darlington configuration.

According to a second aspect of the invention, a device is provided comprising the driver circuit as defined above and further comprising the load circuit.

According to a third aspect of the invention, a method is provided for driving a load circuit via a driver circuit, the driver circuit comprising an input terminal for receiving a source signal from a source and for providing a feeding signal and a charging signal, a capacitor circuit for receiving the charging signal and for providing a supporting signal, and an output terminal for receiving the feeding signal and the supporting signal and for providing the feeding signal and the supporting signal to the load circuit, the method comprising a step of controlling the supporting signal.

According to a fourth aspect of the invention, a computer program product is provided for, when run on a computer, performing the step of the method as defined above.

According to a fifth aspect of the invention, a medium is provided for storing and comprising the computer program product as defined above.

The invention is based on an insight that a capacitor for compensating low amplitudes of a (rectified) source voltage and/or for smoothing amplitude variations of the (rectified) source voltage is relatively disadvantageous owing to the fact that it is bulky and costly and limits a lifetime of a driver circuit. The invention is based on a basic idea that the driver circuit is to be provided with a control circuit for controlling a supporting signal delivered by the capacitor.

The invention has solved a problem to provide a relatively advantageous driver circuit. The invention is further advantageous in that one or more capacitors in the capacitor circuit can become less bulky and/or less costly and/or will limit the lifetime of the driver circuit to a smaller extent, and/or in that the driver circuit can have an improved efficiency. An additional advantage may be situated in the fact that when the capacitor circuit is not continuously connected to the load circuit, a time of current flow from the source to the load circuit is maximized. This is important for a dimmer compatibility, as then it might be possible to operate without an additional bleeder circuit or with a short period of current flow through the bleeder circuit that results in reduced losses in the bleeder circuit.

These and other aspects of the invention are apparent from and will be elucidated with reference to the embodiment(s) described hereinafter.

DETAILED DESCRIPTION OF EMBODIMENTS

Figure 1:
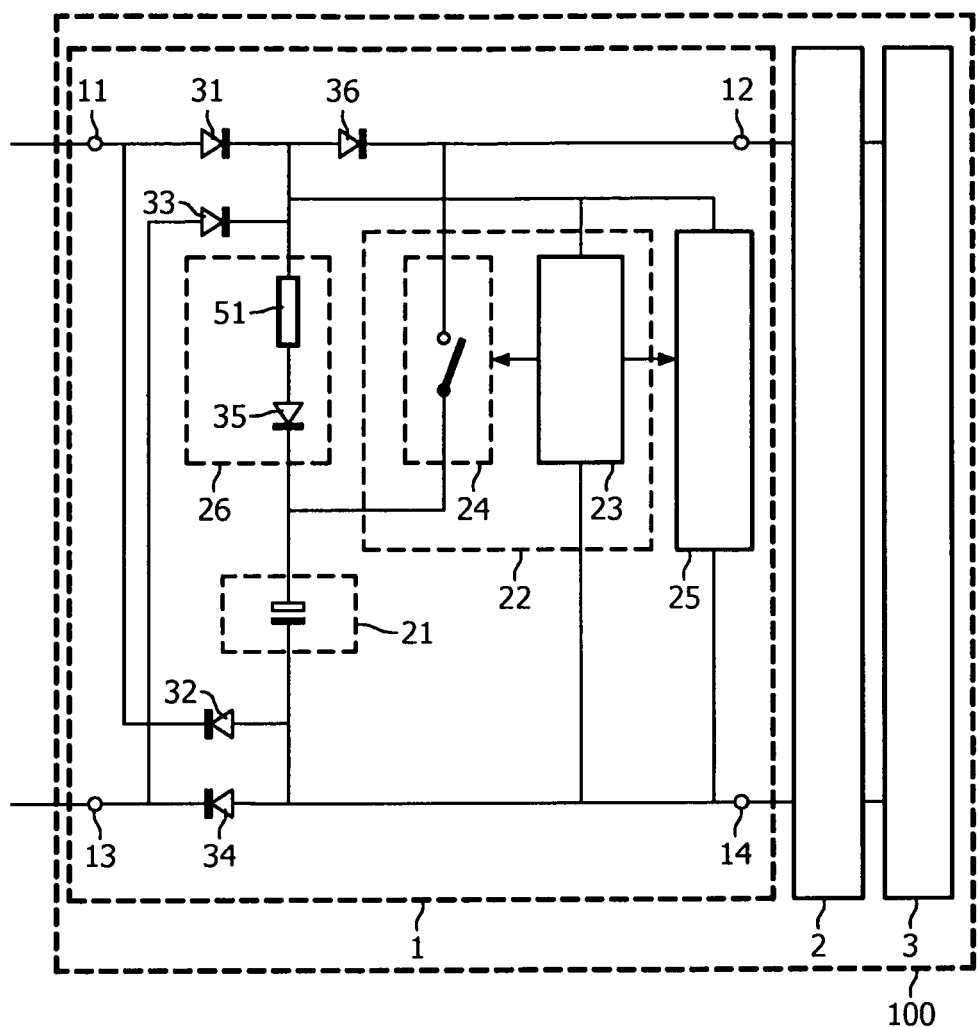
FIG. 1 shows a device comprising a driver circuit and a load circuit.

In the FIG. 1, a device 100 is shown comprising a driver circuit 1 and a load circuit 2, 3. Here, the load circuit 2, 3 comprises a converter 2 followed by a light emitting diode circuit 3, alternatively the load circuit 2, 3 may comprise only a light emitting diode circuit 3 or an electronic lamp circuit with or without converter 2 or with another circuit etc.

The driver circuit 1 may for example comprise an input terminal 11 and a further input terminal 13. The input terminal 11 is adapted for being coupled to one side of a source and the further input terminal 13 is adapted for being coupled to a further side of the source. The driver circuit 1 may for example comprise an output terminal 12 and a further output terminal 14. The output terminal 12 is adapted for being coupled to one side of the load circuit 2, 3 and the further output terminal 14 is adapted for being coupled to a further side of the load circuit 2, 3. The driver circuit 1 may further for example comprise a capacitor circuit 21, a control circuit 22 with a detector 23 and a switch 24, a bleeder circuit 25 and a current limitation circuit 26.

The input terminal 11 is coupled via a diode 31 and a diode 36 to the output terminal 12, and is coupled via the diode 31 to one side of the current limitation circuit 26 and to one side of the detector 23 and to one side of the bleeder circuit 25, and is coupled via a diode 32 to the further output terminal 14. A further side of the current limitation circuit 26 is coupled to one side of the capacitor circuit 21.

The output terminal 12 is coupled to one side of the switch 24. A further side of the switch 24 is coupled to the one side of the capacitor circuit 21.

The further input terminal 13 is coupled via a diode 34 to the further output terminal 14 and to a further side of the capacitor circuit 21 and to a further side of the detector 23 and to a further side of the bleeder circuit 25, and is coupled via a diode 33 to the one sides of the current limitation circuit 26 and the detector 23 and the bleeder circuit 25.

Outputs of the detector 23 are coupled to control inputs of the switch 24 and the bleeder circuit 25. The capacitor circuit 21 for example comprises one or more (electrolytic or foil or ceramic) capacitors. The current limitation circuit 26 for example comprises a serial connection of a resistor 51 and a diode 35.

The input terminal 11 receives a source signal from a source and provides a feeding signal to the output terminal 12 and a charging signal to the capacitor circuit 21. The capacitor circuit 21 provides a supporting signal to the output terminal 12. The output terminal 12 provides the feeding signal and the supporting signal to the load circuit 2, 3. The control circuit 22 controls the supporting signal, for example by detecting a parameter of at least one of the signals via the detector 23, and by controlling the supporting signal in response to a detection result from the detector 23. Said controlling may for example comprise switching, in which case the control circuit 22 may perform said switching via the switch 24.

The bleeder circuit 25 may provide a bleeder current in response to said detection result or in response to a further detection result from the detector 23. The parameter of at least one of the signals to be detected via the detector 23 may be a parameter of the source signal and/or a parameter of the feeding signal. The source signal may be a voltage signal, the feeding signal and the charging signal and the supporting signal may be current signals, the parameter of the source signal may be a voltage amplitude and the parameter of the feeding signal may be a current amplitude.

By letting the capacitor circuit 21 provide the supporting signal only during a part of the time, for example only at moments in time at which the voltage amplitude of the source signal is of a value smaller than a threshold, one or more capacitors in the capacitor circuit 21 can become less bulky and/or less costly and/or will limit the lifetime of the driver circuit 1 to a smaller extent. Possibly, prior art electrolytic capacitors could be replaced by foil or ceramic capacitors that have longer lifetimes.

Alternatively and/or in addition, the detector 23 may detect a parameter of the feeding signal in the form of the current amplitude and control the switch 24 in response to this current amplitude, to let the capacitor circuit 21 provide the supporting signal only during a part of the time, for example only at moments in time at which the current amplitude of the feeding signal is of a value smaller than a further threshold. Alternatively and/or in addition, the detector 23 may detect a parameter of the source signal in the form of timing information and control the switch 24 in response to this timing information. Alternatively and/or in addition, the detector 23 may form part of the load circuit 2, 3.

Figure 2:
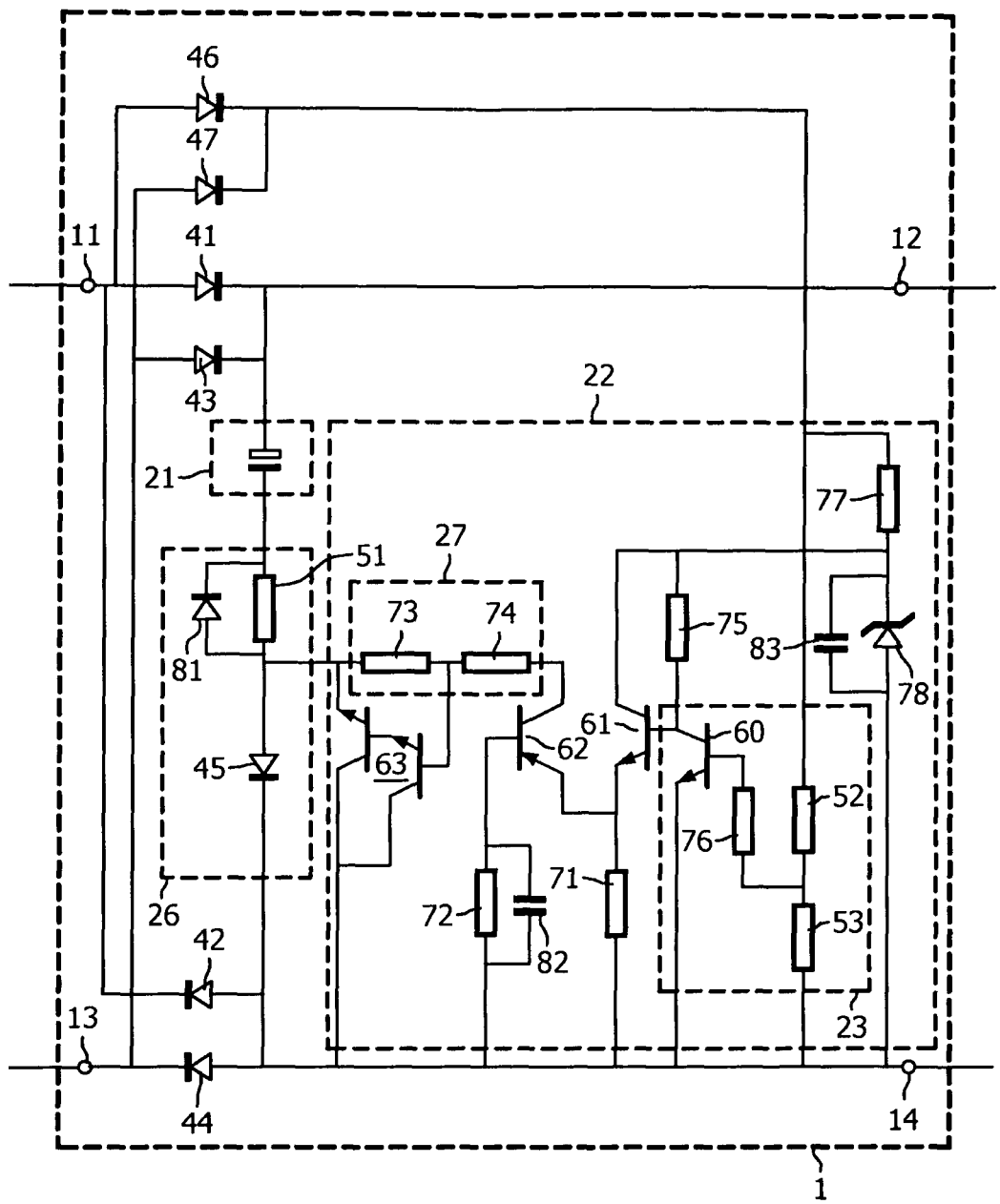
FIG. 2 shows an embodiment of a driver circuit in greater detail.

In the FIG. 2, an embodiment of a driver circuit 1 is shown in greater detail. The driver circuit 1, as already shown for the FIG. 1, may for example comprise an input terminal 11, a further input terminal 13, an output terminal 12, a further output terminal 14, a capacitor circuit 21, a control circuit 22 comprising a detector 23, and a current limitation circuit 26.

The input terminal 11 is coupled via a diode 41 to the output terminal 12 and to one side of the capacitor circuit 21, and is coupled via a diode 42 to the further output terminal 14, and is coupled via a diode 46 to one side of the detector 23. A further side of the capacitor circuit 21 is coupled to one side of the current limitation circuit 26.

The further input terminal 13 is coupled via a diode 44 to the further output terminal 14 and to a further side of the current limitation circuit 26 and to a further side of the detector 23, and is coupled via a diode 43 to the one side of the capacitor circuit 21 and via a diode 47 to a further side of the detector 23.

The detector 23 for example comprises a serial connection of two resistors 52 and 53. The detector 23 for example further comprises a transistor 60. A control electrode of the transistor 60 is coupled via a further resistor 76 to an interconnection in the serial connection of the two resistors 52 and 53. A first main electrode of the transistor 60 is coupled to the further output terminal 14, and a second main electrode of the transistor 60 forms an output of the detector 23 and is coupled via serially interconnected yet further resistors 75 and 77 to the one side of the detector 23. An interconnection between the yet further resistors 75 and 77 is for example coupled via a parallel connection of a zener-diode 78 and a capacitance 83 to the further output terminal 14. The current limitation circuit 26 for example comprises a serial connection of a resistor 51 and a diode 45, with a diode 81 being coupled anti-parallel to the resistor 51.

The control circuit 22 for example comprises a switch based on first, second and third transistors 61-63. A control electrode of the first transistor 61 is coupled to an output of the detector 23. A first main electrode of the first transistor 61 is coupled to the further output terminal 14 via a first resistance 71 and to a first main electrode of the second transistor 62. A second main electrode of the first transistor 61 is coupled to the interconnection between the serially interconnected yet further resistors 75 and 77. A control electrode of the second transistor 62 is coupled to the further output terminal 14 via a second resistance 72 coupled in parallel to a capacitance 82, and a second main electrode of the second transistor 62 is coupled to one side of a further detector 27. This further detector 27 may comprise a further serial connection of two resistances 73 and 74. A further side of the further detector 27 is coupled to a connection between the resistor 51 and the fifth diode 45 of the current limitation circuit 26 and to a first main electrode of the third transistor 63. A control electrode of the third transistor 63 is coupled to an output of the further detector 27, and a second main electrode of the third transistor 63 is coupled to the further output terminal 14. The third transistor 63 may comprise two transistors in a Darlington configuration.

Figure 3:
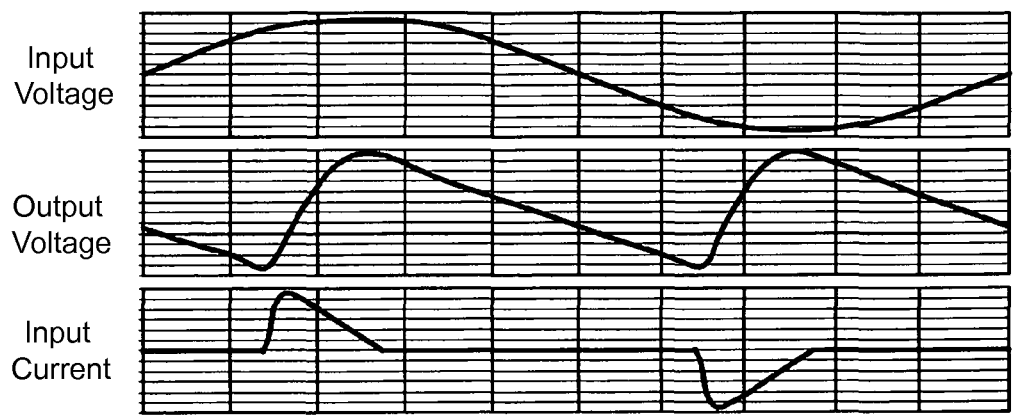
FIG. 3 shows first simulation results.

In the FIG. 3, first simulation results are shown (load circuit=resistor). From top to bottom, an input voltage, an output voltage and an input current as a function of time are shown for a prior art driver circuit based on a rectifier diode bridge and a non-controlled supporting signal (non-switched capacitor circuit). The input current shows that the driver circuit produces a relatively short and strongly peaked current flow and requires a capacitor circuit to be used that is relatively bulky and/or costly and/or limits the lifetime of the driver circuit to a higher extent.

Figure 4:
FIG. 4 shows second simulation results.

In the FIG. 4, second simulation results are shown (load circuit=resistor, bleeder circuit included). From top to bottom, an input voltage, an output voltage and an input current as a function of time are shown for a driver circuit based on a rectifier diode bridge and a controlled supporting signal (switched capacitor circuit). The input current shows, that the driver circuit produces a relatively long and reduced peaked current flow and allows a capacitor circuit to be used that is less bulky and/or less costly and/or limits the lifetime of the driver circuit to a smaller extent. Compared to the FIG. 3, in the FIG. 4 the capacitor circuit has a six times smaller capacitance for the same power level.

Figure 5:
FIG. 5 shows third simulation results.

In the FIG. 5, third simulation results are shown (load circuit=resistor, bleeder circuit excluded). From top to bottom, an input voltage, an output voltage and an input current as a function of time are shown for a driver circuit based on a rectifier diode bridge and a controlled supporting signal (switched capacitor circuit). The input current shows, that the driver circuit produces a relatively long and reduced peaked current flow and allows a capacitor circuit to be used that is less bulky and/or less costly and/or limits the lifetime of the driver circuit to a smaller extent.

For the prior art driver circuit as described for the FIG. 3, one issue of electronic lamps is the flicker induced by a non-constant input power drawn from an alternating-current mains voltage. To reduce this flicker to acceptable levels, usually an electrolytic capacitor (el-cap) of sufficient size has to be used. These capacitors are bulky, costly and form the major contribution to lifetime limitations of such electronics. Another issue is compatibility of electronic lamps to legacy dimmers used in home and office installations. Most of these dimmers require the connected load circuit (e.g. the electronic lamp) to draw a continuous input current, which is not the case for the prior art configuration with an el-cap.

The prior art configuration for simple lamp driver circuits applies a mains rectifier and an electrolytic filter capacitor. By selecting the value of the filter capacitor together with an additional input resistor between the input terminal and the source, minimal requirements of mains current shape, power factor and harmonics are fulfilled. To achieve this input current, a capacitor size and an input resistor have to be selected according to certain (company internal) tables. To enable dimmer compatibility for such a configuration, a continuous base current level has to be added. As the prior art driver circuit draws current only from for example 54° to 108° of half a cycle, the added current has to be applied for 0°...54° and 108°...180°, which is about 70% of the time. This leads to unacceptable losses. Of special importance is the fact that the mains current flow of the prior art configuration stops soon after the voltage has started decreasing from its maximum.

The driver circuit as described for the FIGS. 1, 2, 4 and 5 allows a reduction of the size of the filter capacitor required and a maximization of the time during which current is drawn by the lamp electronics. When combined with a bleeder circuit, this concept enables full dimmer compatibility with minimal additional power consumption.

According to the FIGS. 1, 2, 4 and 5, the capacitor circuit is no longer directly connected to both output terminals all the time. As long as the momentary mains voltage is sufficient to operate the load circuit directly, it gets supplied directly from the mains input. After the momentary voltage level has reduced to a minimum level, the charge in the capacitor circuit is used to bridge the gap and keep the current flowing through the load circuit.

The expressions "providing" and "receiving" may define direct, provisions and receptions and may define indirect provisions and receptions via one or more elements. The expression "coupling" may define a direct coupling or may define an indirect coupling via one or more elements.

Summarizing, driver circuits 1 for driving load circuits 2, 3 receive source signals from sources and provide feeding signals to the load circuits 2,3 and charging signals to capacitor circuits 21. These capacitor circuits 21 provide supporting signals to the load circuits 2, 3 in addition to the feeding signals. By providing the driver circuits 1 with control circuits 22 for controlling the supporting signals, the capacitor circuits 21 can become less bulky/costly and/or will limit the lifetime of the driver circuits 1 to a smaller extent. Further, these driver circuits 1 may get improved efficiencies. Said controlling may comprise controlling moments in time at which the supporting signals are offered to the load circuits 2, 3 or not, and/or may comprise controlling sizes of the supporting signals, and/or may be done in response to detection results from detectors 23 for detecting parameters of one or more signals. Said controlling may comprise switching via switches 24.

While the invention has been illustrated and described in detail in the drawings and foregoing description, such illustration and description are to be considered illustrative or exemplary and not restrictive; the invention is not limited to the disclosed embodiments. For example, it is possible to operate the invention in an embodiment wherein different parts of the different disclosed embodiments are combined into a new embodiment.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A device including a driver circuit for driving a load circuit, the driver circuit comprising:
   an input terminal configured to receive a source voltage from a source and to provide a feeding current and a charging current,
   a capacitor circuit configured to receive the charging current and to provide a supporting current,
   an output terminal configured to receive the feeding current and the supporting current and to provide the feeding current and the supporting current to the load circuit, and
   a control circuit including,
      a switch,
      a detector configured to detect one of the source voltage and the feeding current, and
      a control device configured to provide a control signal to the switch to control the switch to provide the supporting current to the load circuit only when the detected one of the source voltage and the feeding current is less than a threshold,
   wherein the control circuit is configured to inhibit the supporting current from being provided to the load circuit when the detected one of the source voltage and the feeding current exceeds the threshold.

2. The device of claim 1, the driver circuit further comprising a bleeder circuit for outputting a bleeder current in response to a detection result of the detector.

3. The device of claim 1, the driver circuit further comprising;
   a further input terminal, the input terminal being configured to be coupled to one side of the source and the further input terminal being configured to be coupled to a further side of the source, and
   a further output terminal, the output terminal being configured to be coupled to one side of the load circuit and the further output terminal being configured to be coupled to a further side of the load circuit.

4. The device of claim 3, the driver circuit further comprising
   a current limitation circuit for coupling the capacitor circuit to one of the terminals.

5. The device of claim 1, further comprising the load circuit.

6. The device of claim 1, wherein the detector is configured to detect the source voltage, the control device is configured to provide the control signal to the switch to control the switch to provide the supporting current to the load circuit only when the detected source voltage is less than a threshold, and the control circuit is configured to inhibit the supporting current from being provided to the load circuit when the detected source voltage exceeds the threshold.

7. The device of claim 1, wherein the detector is configured to detect the feeding current, the control device is configured to provide the control signal to the switch to control the switch to provide the supporting current to the load circuit only when the detected feeding current is less than a threshold, and the control circuit is configured to inhibit the supporting current from being provided to the load circuit when the detected feeding current exceeds the threshold.

8. The device of claim 1, wherein the control device includes a transistor configured to output the control signal to the switch.

9. The device of claim 1, wherein the detector includes a pair of resistors connected in series with each other, and is configured to output a voltage at a node between the pair of resistors as a comparison voltage for comparison to the threshold.

10. The device of claim 2, wherein the detector includes a pair of resistors connected in series between the input terminal and a further input terminal, and is configured to output a voltage at a node between the pair of resistors as a comparison voltage for comparison to the threshold.

11. A driver circuit for driving a load circuit, the driver circuit comprising
- an input terminal for receiving a source signal from a source and for providing a feeding signal and a charging signal,
- a capacitor circuit for receiving the charging signal and for providing a supporting signal,
- an output terminal for receiving the feeding signal and the supporting signal and for providing the feeding signal and the supporting signal to the load circuit,
- a control circuit for controlling the supporting signal;
- a further input terminal, the input terminal being designed for being coupled to one side of the source and the further input terminal being designed for being coupled to a further side of the source;
- a further output terminal, the output terminal being designed for being coupled to one side of the load circuit and the further output terminal being designed for being coupled to further side of the load circuit; and
- a current limitation circuit for coupling the capacitor circuit to one of the terminals, the input terminal being coupled to the output terminal via a first diode and being coupled to the further output terminal via a second diode, the further input terminal being coupled to the output terminal via a third diode and being coupled to the further output terminal via a fourth diode, and the current limitation circuit comprising a serial connection of a resistor and a fifth diode.

12. The driver circuit of claim 11, the control circuit comprising a detector for detecting an amplitude of the source signal, the detector comprising a serial connection of two resistors, one side of the detector being coupled to the input terminal via a sixth diode and to the further input terminal via a seventh diode, and a further side of the detector being coupled to the further output terminal, the detector further comprising a transistor, a control electrode of the transistor being coupled via a further resistor to an interconnection in the serial connection of the two resistors, a first main electrode of the transistor being coupled to the further output terminal, and a second main electrode of the transistor forming an output of the detector and being coupled via serially interconnected yet further resistors to the one side of the detector.

13. The driver circuit of claim 12, said one of the terminals being the further output terminal, said controlling comprising switching, the control circuit comprising a switch for performing said switching, said switch comprising first, second and third transistors, a control electrode of the first transistor being coupled to the output of the detector, a first main electrode of the first transistor being coupled to the further output terminal via a first resistance and to a first main electrode of the second transistor, a second main electrode of the first transistor being coupled to an interconnection between the serially interconnected yet further resistors, a control electrode of the second transistor being coupled to the further output terminal via a second resistance, a second main electrode of the second transistor being coupled to one side of a further detector, the further detector comprising a further serial connection of two resistors, a further side of the further detector being coupled to a connection between the resistor and the fifth diode of the current limitation circuit and to a first main electrode of the third transistor, a control electrode of the third transistor being coupled to an output of the further detector, and a second main electrode of the third transistor being coupled to the further output terminal.

14. The driver circuit of claim 11, further comprising a bleeder circuit for providing a bleeder current in response to a detection result of a detector.

15. A method for driving a load circuit via a driver circuit, the driver circuit comprising an input terminal for receiving a source voltage from a source and for providing a feeding current and a charging current, a capacitor circuit for receiving the charging current and for providing a supporting current, and an output terminal for receiving the feeding current and the supporting current and for providing the feeding current and the supporting current to the load circuit, the method comprising:
- detecting one of the source voltage and the feeding current,
- providing a control signal to a switch to control the switch to provide the supporting current to the load circuit only when the detected one of the source voltage and the feeding current is less than a threshold, and
- inhibiting the supporting current from being provided to the load circuit when the detected one of the source voltage and the feeding current exceeds the threshold.

16. The method of claim 15, further comprising detecting the source voltage, providing the control signal to the switch to control the switch to provide the supporting current to the load circuit only when the detected source voltage is less than the threshold, and inhibiting the supporting current from being provided to the load circuit when the detected source voltage exceeds the threshold.

17. The method of claim 15, further comprising detecting the feeding current, providing the control signal to the switch to control the switch to provide the supporting current to the load circuit only when the detected feeding current is less than a threshold, and inhibiting the supporting current from being provided to the load circuit when the detected feeding current exceeds the threshold.

* * * * *